(12) United States Patent
Lantinen

(10) Patent No.: US 8,844,720 B2
(45) Date of Patent: Sep. 30, 2014

(54) BIODEGRADABLE NOVELTY PACKAGE

(76) Inventor: Christine Ann Lantinen, Plymouth, MN (US)

( * ) Notice: Subject to any disclaimer, the term of this patent is extended or adjusted under 35 U.S.C. 154(b) by 189 days.

(21) Appl. No.: 13/023,691

(22) Filed: Feb. 9, 2011

(65) Prior Publication Data
US 2012/0074029 A1    Mar. 29, 2012

Related U.S. Application Data

(60) Provisional application No. 61/386,238, filed on Sep. 24, 2010.

(51) Int. Cl.
*B65D 73/00*    (2006.01)
*B65D 65/46*    (2006.01)
*B65D 85/60*    (2006.01)

(52) U.S. Cl.
CPC ............ *B65D 65/466* (2013.01); *B65D 85/60* (2013.01)
USPC ........................................ 206/457; 206/524.7

(58) Field of Classification Search
USPC ........... 206/457, 524.6, 524.7; 220/4.21, 4.28
See application file for complete search history.

(56) References Cited

U.S. PATENT DOCUMENTS

| | | | | |
|---|---|---|---|---|
| 5,209,345 A | * | 5/1993 | Haugabook | 206/457 |
| 5,384,173 A | * | 1/1995 | Akao et al. | 428/35.7 |
| 5,743,404 A | * | 4/1998 | Melashenko et al. | 206/524.3 |
| 5,871,143 A | * | 2/1999 | Nestler et al. | 229/4.5 |
| D434,978 S | * | 12/2000 | Thill | D3/270 |
| 2004/0007490 A1 | * | 1/2004 | Bowman et al. | 206/457 |
| 2006/0118448 A1 | * | 6/2006 | Fanning et al. | 206/457 |
| 2009/0211941 A1 | * | 8/2009 | Maroofian et al. | 206/776 |
| 2009/0258175 A1 | * | 10/2009 | Matsuoka et al. | 428/36.5 |
| 2010/0147736 A1 | * | 6/2010 | West et al. | 206/581 |

OTHER PUBLICATIONS

D. Blumchen & Company, Inc., "Papier-Mache Easter Eggs", www.blumchen.com/easter_shop_papier_mache_eggs, Copyright 2008, pp. 3.
NatureWorks LLC, "NatureWorks Biopolymer 3251D, Injection Molding Process Guide", Copyright 2008, pp. 3.
NatureWorks LLC, "Renewable Progress Combining the Best of Nature and Know-How", www.NatureWorksPLA.com, 2005, pp. 1.

* cited by examiner

*Primary Examiner* — Luan K Bui

(74) *Attorney, Agent, or Firm* — Pauly, Devries, Smith & Deffner, LLC

(57) ABSTRACT

Biodegradable novelty packages, which can take the shape of eggs (i.e., ellipsoids), for example, are useful for containing small toys, candy or the like. Such small toys, candy and the like are often hidden in petroleum-based plastic eggs for children's amusement. Biodegradable novelty packages as described herein are formed of a biodegradable resin, such as a biodegradable thermoplastic.

5 Claims, 3 Drawing Sheets

BIODEGRADABLE NOVELTY PACKAGE

RELATED APPLICATION

The present application claims priority to U.S. Provisional Patent Application Ser. No. 61/386,238, filed Sep. 24, 2010 and titled, "BIODEGRADABLE NOVELTY PACKAGE," which is commonly assigned and incorporated by reference herein in its entirety.

TECHNICAL FIELD

The present disclosure relates generally to biodegradable novelty packages and, in particular, in one or more embodiments, the present disclosure relates to compostable plastic eggs.

BACKGROUND

A common Easter tradition involves Easter egg hunts, where colored eggs are hidden for children to find. This tradition has generally evolved away from the use of real eggs, and has instead gravitated toward the use of colored plastic eggs. These petroleum-based plastic eggs are typically two-part packages, that can be filled with small toys, candy and the like. Similarly, in another Easter tradition, Easter baskets are often presented to children containing such colored plastic eggs, again typically filled with small toys, candy and the like. Such use generates a large amount of plastic waste, resulting in significant waste of petroleum resources. While people have looked to ways of repurposing these plastic eggs, such as using them in children's play kitchens, or in the creation of Easter wreaths using them as decorations, a significant portion of these plastic eggs are likely to end up in landfills or incinerators.

For the reasons stated above, and for other reasons stated below which will become apparent to those skilled in the art upon reading and understanding the present specification, there is a need in the art for alternatives to traditional plastic eggs.

DETAILED DESCRIPTION

Figure 1A:
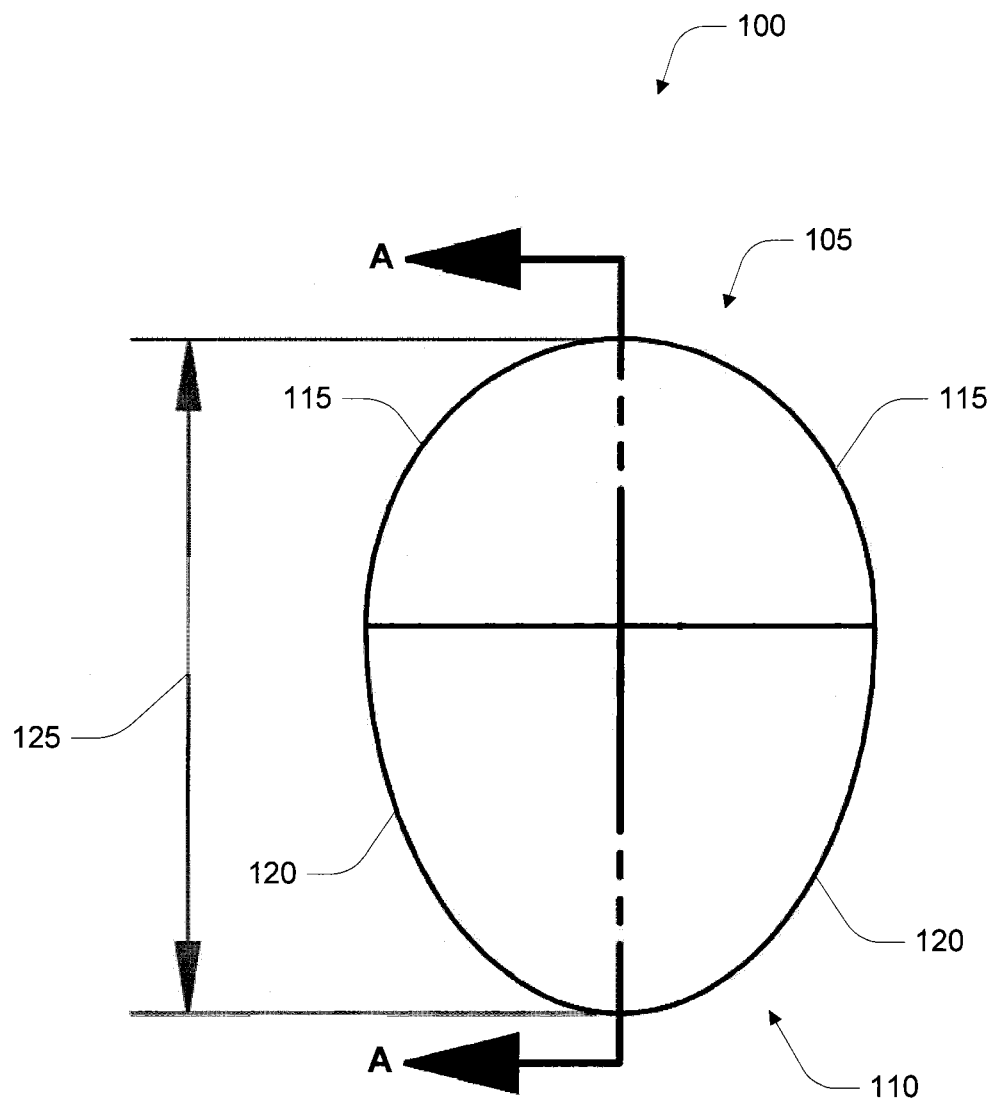
FIG. 1A is a view of a package in accordance with an embodiment of the disclosure.

FIG. 1A depicts a package 100. The package 100 is a novelty package. For example, the package 100 may be egg-shaped (e.g., an ellipsoid) as depicted, such as might be used to enclose small toys, candy or the like. Alternatively, the package 100 may be some other shape, such as a sphere, a polyhedron or some other three-dimensional regular or irregular shape. The package 100 includes two or more portions defining sidewalls of the package 100, each configured to mate with at least one other of the two or more portions.

In the example of FIG. 1A, the package 100 includes a first portion 105 having sidewalls 115. The package 100 further includes a second portion 110 having sidewalls 120. The sidewalls may have, for example, a thickness of 0.05 inches (1.25 mm) to 0.1 inches (2.5 mm) or more. The package 100 has a height 125, e.g., 2.97 inches (75 mm).

Figure 1B:
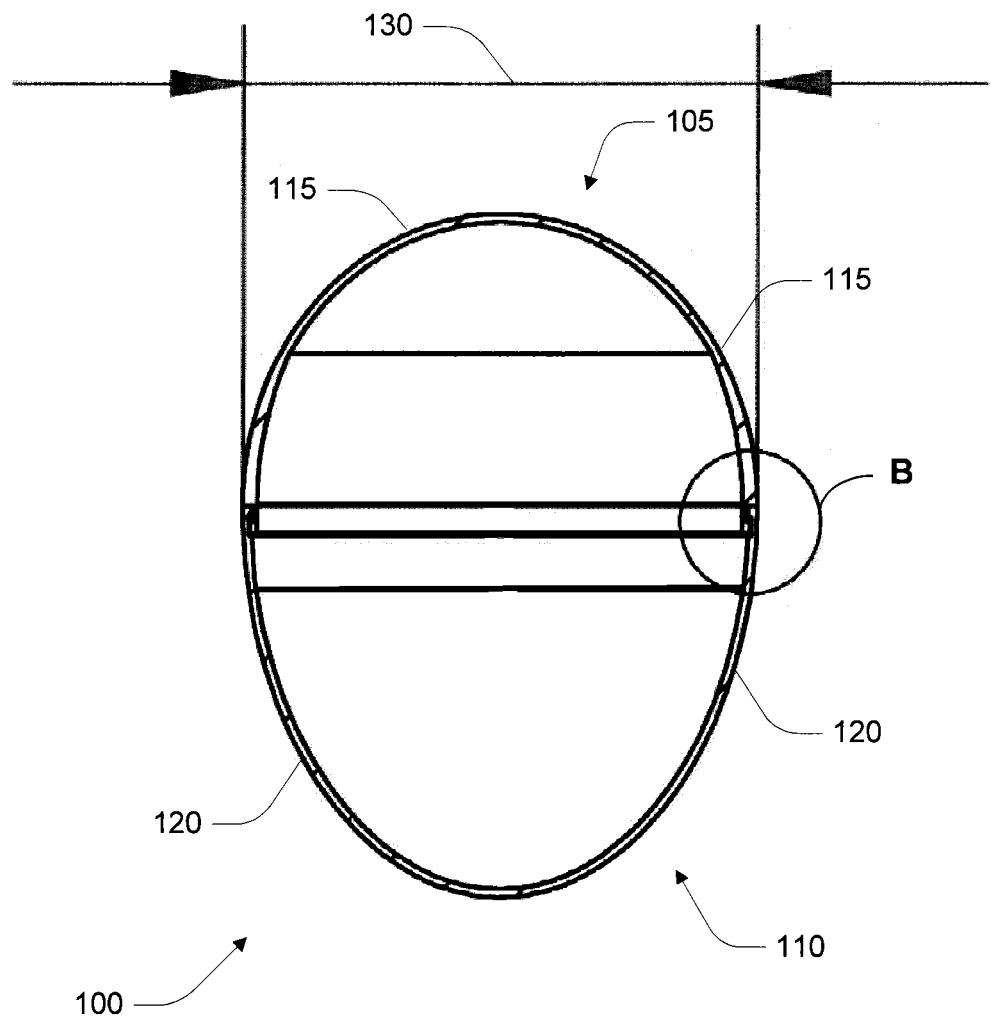
FIG. 1B is a cross-sectional view of the package of FIG. 1A in accordance with an embodiment of the disclosure.

FIG. 1B is a cross-sectional view of the package 100 taken along line A-A of FIG. 1A. The package 100 has a width 130, e.g., 2.25 inches (57 mm). In the case of the example ellipsoid package 100, or in the case of a spherical package or the like, the width 130 may also represent a diameter (e.g., a maximum exterior diameter) of the package 100. The single layer sidewalls 115 and 120 of the first and second portions 105 and 110, respectively, define a hollowed interior of the package 100.

Figure 1C:
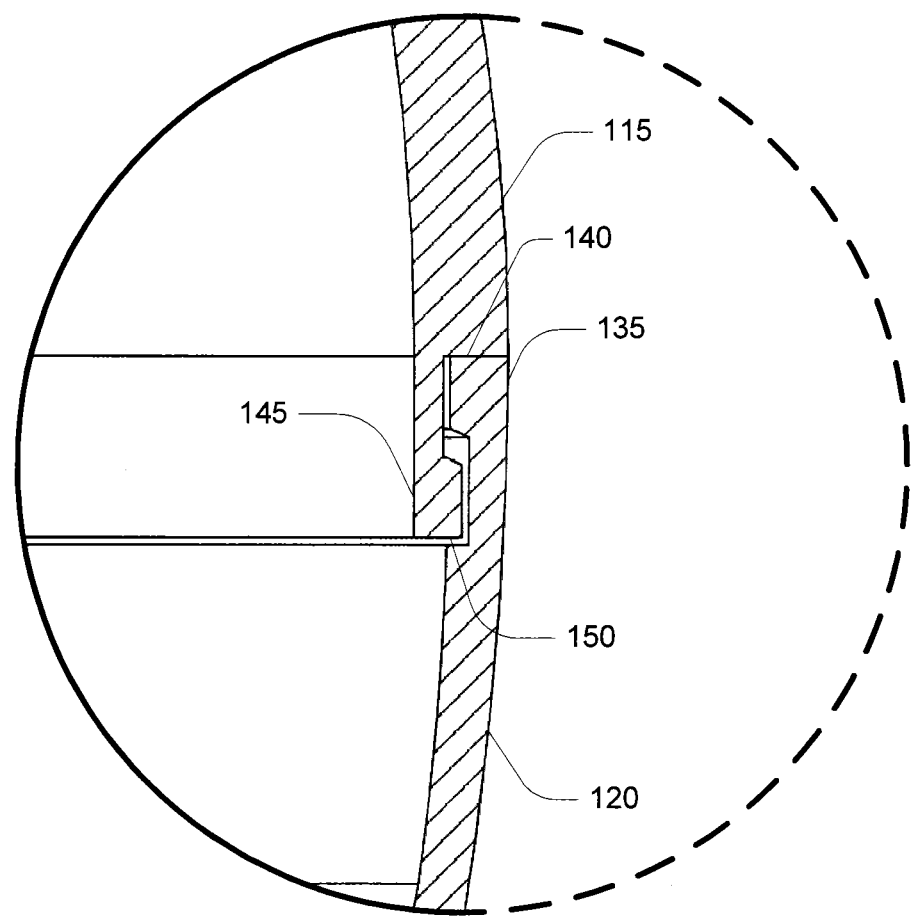
FIG. 1C is an expanded view of a portion of the cross-sectional view of FIG. 1B in accordance with an embodiment of the disclosure.

FIG. 1C is expanded view of cut-out B of FIG. 1B showing more detail of one example mating configuration for the first portion 105 to the second portion 110. As shown in FIG. 1C, the sidewall 115 (of first portion 105) includes a rim 135 having an outwardly-facing (i.e., facing toward the exterior of the package 100) flange 140, while the sidewall 120 (of second portion 110) includes a rim 145 having an inwardly-facing (i.e., facing toward the interior of the package 100) flange 150. The flange 140 and the flange 150 are configured to snap together, such as through flexure of one or both of the rims 135 and 145. This permits the package 100 to be opened (i.e., taken apart) and closed (i.e., reassembled) more than once. Other embodiments could utilize a simple pressure-fit connection, i.e., without snap-fit flanges as shown in FIG. 1C. For example, an inner diameter of rim 135 could be substantially equal (e.g., equal) to an outer diameter of rim 145 such that simple friction could be used to releasably hold the two portions 105 and 110 together. The flange 140 and 150 is most effectively placed at a joint in a circular cross section of the ellipsoid.

The package 100 is a biodegradable novelty package. The portions 105 and 110 of the package 100 are formed of a biodegradable resin, e.g., a biodegradable thermoplastic.

Applicant notes that a biodegradable resin should have sufficient rigidity to form a novelty package of the type described herein while being sufficiently flexible to form a self-closure, such as a snap-fit or pressure fit closure of the type described herein, and without being brittle to the point of raising safety concerns; sufficient strength to facilitate thin-walled construction of the package; sufficient stability to be warehoused and displayed on retail shelves for extended periods, as well as sufficient stability to contain candies and other foodstuffs and to endure environments in which the package may be likely to be placed in use; and the ability to incorporate colorants. As one example, Applicant has identified PLA (polylactic acid)-based resins as suitable biodegradable resins. PLA can be made from renewable resources, such as corn starch or sugars. PLA can be 100% compostable and it can be shelf stable until subjected to heat, moisture and microorganisms typically found in a compost. Applicant has further identified certain physical characteristics that appear to meet these criteria for PLA-based resins. For example, a PLA-based resin having a Crystalline Melt Temperature of approximately 160-170° C., a Glass Transition Temperature of approximately 55-65° C., a Tensile Yield Strength of approximately 7,000 psi (48 MPa), a Tensile Elongation of approximately 2.5%, a Notched Izod Impact of approximately 0.3 ft-lb/in (0.16 J/m), a Flexural Strength of approximately 12,000 psi (83 MPa), and a Flexural Modulus of approximately 555,000 psi (3828 MPa) appears to meet Applicant's criteria. Applicant notes that other physical characteristics may also meet the criteria.

One specific example of a PLA-based thermoplastic for use in the package 100 is Biopolymer 3251D, available through NatureWorks (Minnetonka, Minn., USA). The Biopolymer 3251D is a thermoplastic, capable of use for forming the package 100 using injection molding techniques. The Biopolymer 3251D is compostable, and has the rigidity, strength, flexibility and ability to incorporate colorants to form a novelty package, such as a plastic egg.

Applicant notes that a variety of biodegradable resins fail to meet these criteria established by Applicant. Not all biodegradable plastics are colorable or rigid enough to be used for items such as plastic eggs. Some biodegradable resins lack sufficient stability. For example, some biodegradable plastics break down merely upon contact with water or with excessive heat or may simply break down primarily based on its age.

In addition to PLA-based thermoplastic, the portions of the package 100 may contain additional chemical components that do not materially affect the basic and novel properties of the package 100 disclosed herein. For example intentional additions, such as colorants, or unintentional additions, such as low-level contaminants common in industrial environments, may be contained within its portions without materially affecting its basic and novel properties.

CONCLUSION

Biodegradable novelty packages are described herein. The biodegradable novelty packages are formed of a biodegradable resin. Such packages can be used, for example, as plastic Easter eggs or the like. These biodegradable novelty packages would not only reduce the use of petroleum resources, they would reduce the strain on landfills or incinerators, and the pollution associated therewith.

What is claimed is:

1. A biodegradable novelty egg comprising:
   (i) a first ellipsoid portion having single layer wall with a thickness of at least 0.05 inches and a mating configuration comprising a first rim defining an opening;
   (ii) a second ellipsoid portion having single layer wall with a thickness of at least 0.05 inches, a surface area less than the first portion and a mating configuration comprising a second rim defining an opening; and
   wherein the egg comprises sufficient package rigidity and package forming flexibility, the first and second rims comprising an inwardly facing snap fit-flange and an outwardly facing snap-fit flange that permits the package to be taken apart and reassembled through a flexure of one or both flanges and are configured to seat and form the egg with an enclosed volume sufficient for small toys and candy; and
   (a) the egg comprises: a poly-lactic acid-based thermoplastic,
   (b) an effective amount of a colorant, and
   (c) an effective amount of an additional component that can act to increase thin wall strength, storage stability, rigidity to act as a container and flexibility to form the egg.

2. The egg of claim 1, wherein the poly-lactic acid-based thermoplastic comprises a Crystalline Melt Temperature of 160-170° C. and a Glass Transition Temperature of 55-65° C.

3. The egg of claim 1, wherein the poly-lactic acid-based thermoplastic further comprises a Tensile Yield Strength of approximately 7,000 psi, a Tensile Elongation of approximately 2.5%, a Notched Izod Impact of approximately 0.3 ft-lb/in, a Flexural Strength of approximately 12,000 psi, and a Flexural Modulus of approximately 555,000 psi.

4. The egg of claim 1, wherein the outwardly-facing flange is configured to seat with the inwardly-facing flange.

5. The egg of claim 1, wherein the outwardly-facing flange comprises the diameter of a circular cross-section of the ellipsoid.

\* \* \* \* \*